United States Patent
Tanaka (10) Patent No.: US 8,184,733 B2
(45) Date of Patent: May 22, 2012

(54) RADIO RECEPTION DEVICE, RADIO TRANSMISSION DEVICE, RADIO BASE STATION, RECEPTION METHOD, AND TRANSMISSION METHOD

(75) Inventor: Takanori Tanaka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 549 days.

(21) Appl. No.: 12/295,233

(22) PCT Filed: Mar. 28, 2007

(86) PCT No.: PCT/JP2007/056739
§ 371 (c)(1),
(2), (4) Date: Jun. 26, 2009

(87) PCT Pub. No.: WO2007/114197
PCT Pub. Date: Oct. 11, 2007

(65) Prior Publication Data
US 2009/0316808 A1    Dec. 24, 2009

(30) Foreign Application Priority Data

Mar. 29, 2006   (JP) .................................. 2006-092429
Mar. 29, 2006   (JP) .................................. 2006-092430

(51) Int. Cl.
  *H04B 7/02* (2006.01)
(52) U.S. Cl. ...................................................... 375/267
(58) Field of Classification Search .................. 375/260, 375/267, 347
See application file for complete search history.

(56) References Cited

U.S. PATENT DOCUMENTS

| | | | |
|---|---|---|---|
| 2006/0183504 A1* | 8/2006 | Tanaka et al. | 455/561 |
| 2007/0253476 A1* | 11/2007 | Tirkkonen et al. | 375/230 |
| 2009/0161641 A1* | 6/2009 | Kim | 370/338 |

FOREIGN PATENT DOCUMENTS

| | | |
|---|---|---|
| JP | 2000-183844 | 6/2000 |
| JP | 2002-368714 | 12/2002 |
| JP | 2003-152676 | 5/2003 |
| JP | 2003-218772 | 7/2003 |
| JP | 2003-264526 | 9/2003 |
| JP | 2004-088767 | 3/2004 |
| JP | 2006-025328 | 1/2006 |
| WO | 2006/087977 | 8/2006 |
| WO | 2006/134949 | 12/2006 |

* cited by examiner

*Primary Examiner* — Don N Vo
(74) *Attorney, Agent, or Firm* — DLA Piper LLP (US)

(57) ABSTRACT

An OFDM radio reception device 100 with multiple antennas 110-1 to 110-K removes a guard interval CP from each received signal, and performs S/P conversion, FFT, and channel estimation, on each received signal. The OFDM radio reception device 100 performs channel equalization by multiplying each signal resulting from FFT by a corresponding channel response value obtained by channel estimation. Moreover, the OFDM radio reception device 100 obtains a covariance matrix for each of the busts, and then calculates a reception weighting factor on the basis of each covariance matrix. Furthermore, the OFDM radio reception device 100 multiplies each signal mapped to the corresponding burst by the corresponding reception weighting factor, and then combines the received signals.

28 Claims, 5 Drawing Sheets

RADIO RECEPTION DEVICE, RADIO TRANSMISSION DEVICE, RADIO BASE STATION, RECEPTION METHOD, AND TRANSMISSION METHOD

CROSS-REFERENCE TO RELATED APPLICATIONS

This application is a national stage of international application no. PCT/JP2007/056739, filed on Mar. 28, 2007, and claims the benefit of priority under 35 USC 119 of Japanese patent application no. 2006-092429, filed on Mar. 29, 2006 and Japanese patent application no. 2006-092430, filed on Mar. 29, 2006. The entire contents of these applications are incorporated herein by reference.

TECHNICAL FIELD

The present invention relates to a radio reception device, a radio transmission device, a radio base station, a reception method, and a transmission method which use orthogonal frequency division multiplex (OFDM).

BACKGROUND ART

Adaptive array processing (hereinafter, AAS processing) performed by a so-called adaptive antenna system (AAS) has been known (for example, Patent Document 1). The AAS processing is performed to find a weighting factor to be used for providing directivity to a desired wave by suppressing delay waves and interference waves, in an OFDM radio transmission/reception device.

In the AAS processing, when the OFDM radio transmission/reception device receives a radio signal, a diversity gain by multiple antennas is obtained only for a desired signal by suppressing delay waves and interference waves.

When the OFDM radio transmission/reception device transmits a radio signal, a radio signal generated by adding gains corresponding to the number of the antennas and a beamforming gain is transmitted to a desired terminal. Accordingly, reception of interference waves by a terminal other than the desired terminal can be suppressed.

However, in the OFDM, when adjacent sub-carriers are not orthogonal to each other, errors in the decoding of received signals increase. For this reason, channel estimation for each sub-carrier is required in the OFDM.

The radio communication device described in Patent Document 1 performs AAS processing in OFDM after channel estimation to optimize a direct wave or a delay wave received at a high reception level among received signals.

Patent Document 1: Japanese Patent Application Publication No. 2003-264526

DISCLOSURE OF THE INVENTION

In the radio communication device described in Patent Document 1, when a direct wave is received or a delay wave is received at a high reception level, the accuracy in channel estimation, i.e. the accuracy in AAS processing, is high. However, in a propagation path environment where selection of a desired wave is difficult, for example, when no direct wave is received and several delay waves are received, the accuracy in AAS processing decreases.

In addition, in channel estimation, repeating IFFT and FFT may impose excessive processing load on the processor.

The present invention has been made in view of the above-described circumstance, and has an object of providing a radio reception device, a radio transmission device, a radio base station, a reception method, and a transmission method which enable highly-accurate AAS processing while reducing processing load.

Moreover, another object of the present invention is to provide a radio reception device, a radio transmission device, a radio base station, a reception method, and a transmission method which can increase accuracy in AAS processing in a multipath propagation environment occurring in communications in an urban area or in communications between moving terminals. To achieve the above-described objects, a radio reception device according to a first aspect of the present invention comprises: a plurality of antennas; a channel estimation unit configured to perform channel estimation for received signals of each of the antennas; a channel equalization unit configured to perform channel equalization on channel response values estimated by the channel estimation unit; and a burst distributor configured to distribute the received signals to a plurality of bursts. Here, the burst distributor includes: a calculator configured to calculate reception weighting factors of the respective antennas; a multiplier configured to multiply each of the received signals by the corresponding reception weighting factor; and a combiner configured to combine the received signals each multiplied by the corresponding reception weighting factor by the multiplier.

The radio transmission device according to a second aspect of the present invention comprises: a plurality of antennas; a weighting unit configured to perform a predetermined weighting to a transmission signal component of each of the antennas; a distributor configured to distribute the weighted transmission signals to the respective antennas; a channel equalization unit configured to perform channel equalization on at least channel response values of channels by use of the distributed weighted transmission signals as frequency components; and a transmitter configured to perform time-domain conversion on the transmission signals on which channel equalization has been performed, and to then transmit the resultant signals in a predetermined format from the antennas.

A radio base station according to a third aspect of the present invention comprises: a plurality of antennas; a radio reception device configured to receive a radio signal; and a radio transmission device configured to transmit a radio signal in a predetermined format through each antenna. Here, the radio reception device includes: a channel estimation unit configured to perform channel estimation for received signals of each of the antennas; a channel equalization unit configured to perform channel equalization on channel response values estimated by the channel estimation unit; and a burst distributor configured to distribute the received signals to a plurality of bursts. The burst distributor includes: a calculator configured to calculate reception weighting factors of the respective antennas; a multiplier configured to multiply each of the received signals by the corresponding reception weighting factor; and a combiner configured to combine the received signals each multiplied by the corresponding reception weighting factor by the multiplier. The radio transmission device includes: a weighting unit configured to perform a predetermined weighting to a transmission signal component of each of the antennas; a distributor configured to distribute the weighted transmission signals to the respective antennas; a channel equalization unit configured to perform channel equalization on at least channel response values of channels by use of the distributed weighted transmission signals as frequency components; and a transmitter configured to perform time-domain conversion on the transmission signals on which channel equalization has been performed, and to then transmit the resultant signals in a predetermined format from the antennas.

Preferably, the burst distributor: distributes the received signals to the bursts, and thereafter obtains covariance matrices of the respective bursts; and calculates a transmission weighting factor on the basis of each of the covariance matrices, and then stores the transmission weighting factor of each of the bursts. Moreover, preferably, the weighting unit of the radio transmission device performs weighting on the basis of the stored transmission weighting factors.

Preferably, the channel estimation unit of the radio reception device obtains a ratio of each of the received signal to a desired signal determined for each sub-channel of a certain frequency band, as a channel response value, and the channel equalization unit performs channel equalization for each sub-channel.

Preferably, the channel estimation unit performs frequency-domain conversion on each of the received signals and thereafter estimates the channel response values.

Preferably, an output signal of the channel equalization unit contains a predetermined preamble signal, and the multiplier estimates a reception weighting factor through matrix manipulation using Cholesky decomposition.

Preferably, an output signal of the channel equalization unit of the radio reception device contains a predetermined preamble signal, and the weighting unit of the radio reception device estimates a transmission weighting factor through matrix manipulation using Cholesky decomposition.

Preferably, the channel equalization unit of the radio transmission device multiplies the channel response value of each of the channels by a calibration vector for compensating a path difference between a transmitting side and a receiving side so as to obtain factors, and then multiplies each of signals obtained by dividing the distributed weighted transmission signals in accordance with frequency components, by the corresponding factor, thereby performing channel equalization. A fourth aspect of the present invention provides a reception method employing an orthogonal frequency division multiplex scheme using multiple sub-channels. The reception method comprises: a first step of performing a channel estimation for each of received signals of a plurality of antennas; a second step of performing channel equalization on channel response values estimated in the first step; and a third step of distributing the received signals to a plurality of bursts on the basis of relationships between the sub-channels and the plurality of bursts. Here, the third step includes: a fourth step of obtaining a covariance matrix, and calculating reception weighting factors of the respective antennas on the basis of the covariance matrix; a fifth step of multiplying each of the received signals by the corresponding reception weighting factor; and a sixth step of combining the received signals each multiplied by the corresponding reception weighting factor.

A fifth aspect of the present invention provides a transmission method employing an orthogonal frequency division multiplex scheme using multiple sub-channels. Here, the transmission method comprises: a first step of performing a predetermined weighting to a transmission signal component of each of the antennas; a second step of distributing the weighted transmission signals to the respective antennas; a third step of setting the distributed weighted transmission signals as frequency components; a fourth step of multiplying the channel response value of each of the channels by a calibration vector of a sub-carrier for compensating a path difference between a transmitting side and a receiving side so as to obtain factors, and then multiplying each of signals obtained by dividing the distributed weighted transmission signals in accordance with frequency components, by the corresponding factor, thereby performing channel equalization; and a fifth step of performing time-domain conversion on the transmission signals on which channel equalization has been performed, and then transmitting the resultant signals in a predetermined format from the antennas.

According to the aspects of the present invention, a radio reception device, a radio transmission device, a radio base station, a reception method, and a transmission method which enable highly-accurate AAS processing while reducing processing load can be provided.

Moreover, according to the present invention, a radio reception device, a radio transmission device, a radio base station, a reception method, and a transmission method which can increase accuracy in AAS processing in a multipath propagation environment occurring in communications in an urban area and with a mobile terminal can be provided.

BEST MODES FOR CARRYING OUT THE INVENTION

First Embodiment

A first embodiment of the present invention will be described below with reference to accompanying drawings.

Figure 1:
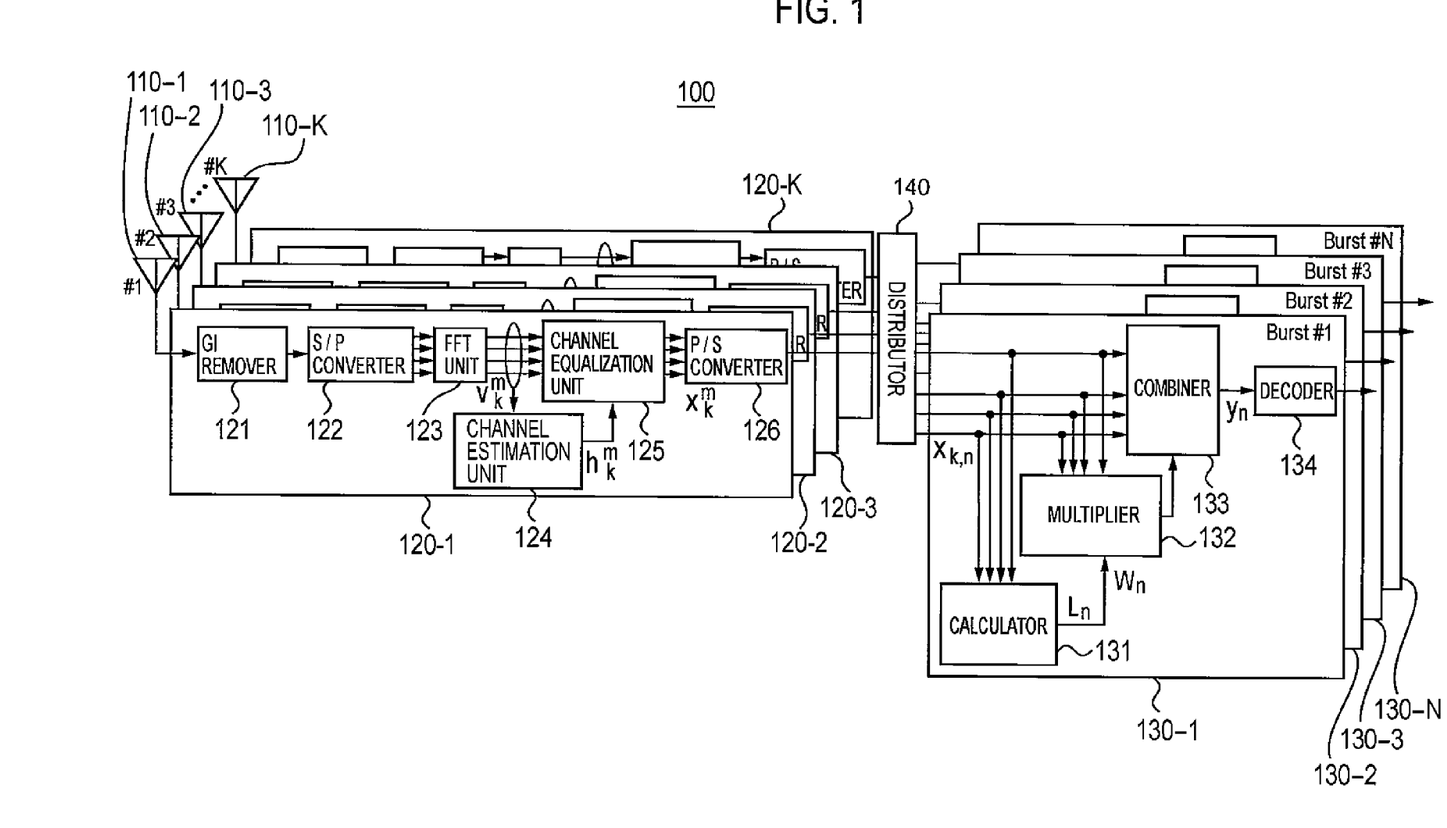
FIG. 1 is a block diagram of an OFDM radio reception device according to an embodiment of the present invention.
Figure 2:
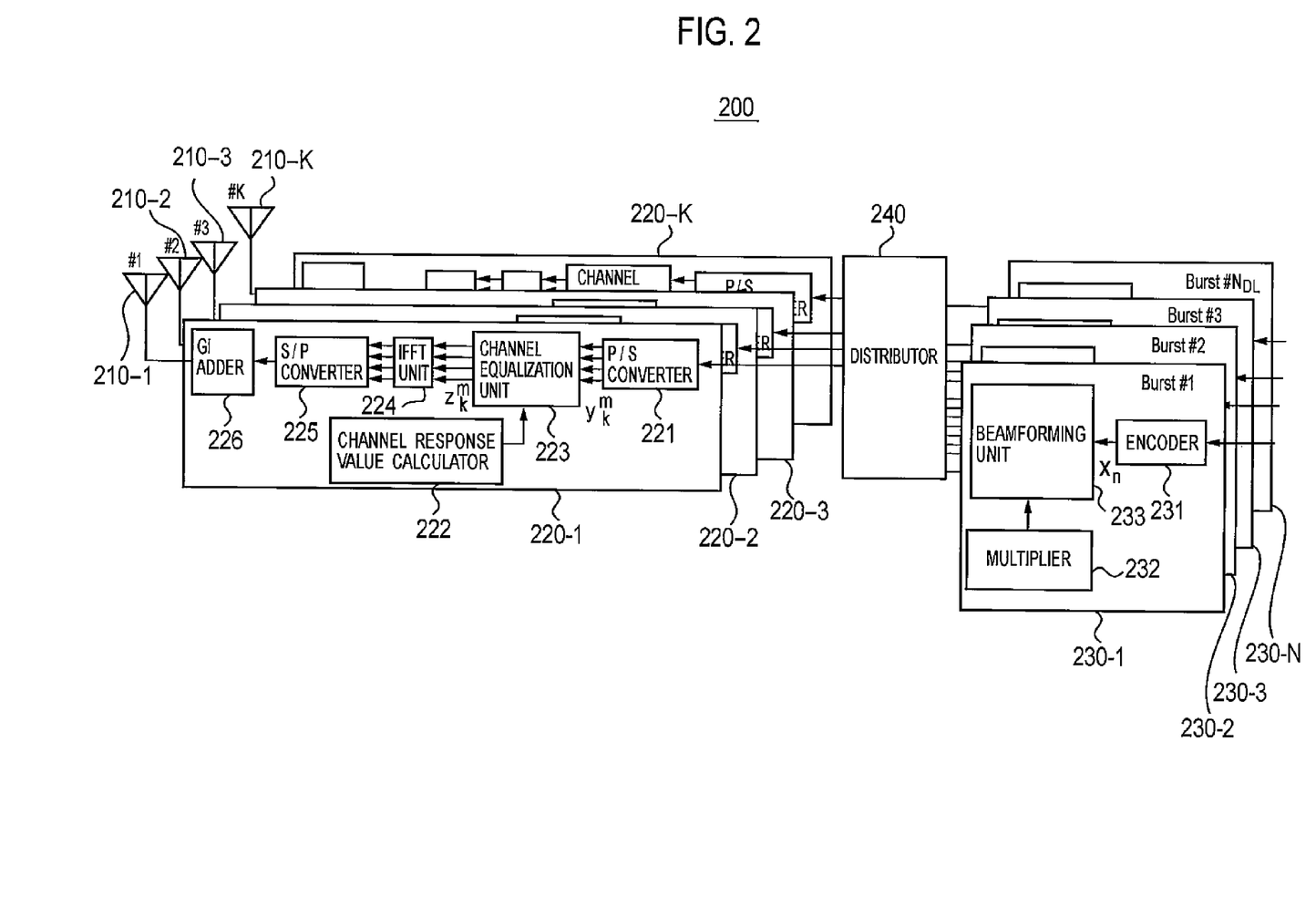
FIG. 2 is a block diagram of an OFDM radio transmission device according to the embodiment of the present invention.

FIG. 1 is a block diagram of an OFDM radio reception device according to this embodiment. FIG. 2 is a block diagram of an OFDM radio transmission device according to this embodiment.

An OFDM radio reception device 100 includes an AAS (adaptive antenna system). Specifically, the OFDM radio reception device 100 includes, as shown in FIG. 1: multiple (K in this embodiment) antennas 110-1 to 110-K; reception processors 120-1 to 120-K provided so as to correspond to the antennas 110-1 to 110-K, respectively, and each performing channel estimation processing, channel equalization processing and the like for a received signal; multiple (N in this embodiment) burst units 130-1 to 130-N; and a distributor 140 distributing received signals processed by the reception processors 120-1 to 120-K to the burst units 130-1 to 130-N. In this embodiment, the burst units 130-1 to 130-N and the distributor 140 form a burst distributor.

The reception processors 120-1 to 120-K each include: a guard interval remover 121 removing a guard interval CP from a digitalized received signal; a serial/parallel converter (S/P) 122 converting the serial signal from which a guard interval CP is removed, to a parallel signal; a fast Fourier transform (FFT) unit 123 performing fast Fourier transform on the parallel signal outputted from the serial/parallel converter 122; a channel estimation unit 124 performing channel estimation on the basis of a signal outputted from the FFT unit 123; a channel equalization unit 125 performing channel equalization processing by multiplying a signal resulting from the fast Fourier transform of the FFT unit 123, by a channel response value obtained by the channel estimation unit 124; and a parallel/serial converter 126 converting the received signal on which the channel equalization processing has been performed by the channel equalization unit 125, from a parallel signal to a serial signal.

The distributor 140 distributes received signals $x_{k,n}$ to each of the burst units 130-1 to 130-N. In other words, the distributor 140 performs mapping (physical to logical mapping) of data corresponding to predetermined frequency domain symbols as the received signals for the respective bursts.

The burst units 130-1 to 130-N each include: a calculator 131 obtaining a common covariance matrix (Ln) for multiple users, from the distributed received signals, and then calculating a reception weighting factor $W_n$ of the antennas 110-1 to 110-K for desired users, on the basis of the obtained covariance matrix; an multiplier 132 multiplies the received signals by the weighting factor $W_n$ supplied from the calculator 131; a combiner 133 combining (synthesizing) received signals distributed by the distributor 140 on the basis of the weighting factor multiplied by the multiplier 132; and a decoder 134 performing decoding processing for signals outputted from the combiner 133 and separated for the respective desired user. Here, the combiner 133 can also extract a desired signal for each SDMA user.

An OFDM radio transmission device 200 includes an AAS (adaptive antenna system). Specifically, the OFDM radio transmission device 200 includes, as shown in FIG. 2: multiple (K in this embodiment) antennas 210-1 to 210-K (110-1 to 110-K); transmission processors (data generators) 220-1 to 220-K provided so as to correspond to the antennas 210-1 to 210-K respectively, and performing channel estimation processing, channel equalization processing, and the like for a radio signal transmitted from the antennas; multiple (N in this embodiment) burst units 230-1 to 230-N; and a distributor 240 mapping (distributing) signal components which are obtained in the respective burst units 230-1 to 230-N and are to be transmitted to the respective antennas, to the respective transmission processors 220-1 to 220-K.

The burst units 230-1 to 230-N each include: an encoder 231 outputting a signal $x_n$ obtained by encoding and then modulating every burst of signals transmitted in the entire band; a multiplier 232 calculating a weighting factor $W_n^{DL}$ by use of a transmission weighting factor calculated in advance; and a beamforming unit 233 multiplying the signal $x_n$, obtained by the encoder 231, by the transmission weighting factor $W_n^{DL}$, calculated by the multiplier 232, and adding multiplexed signals for each of the antennas to the obtained value. The beamforming unit 233 generates signal components to be transmitted to the antennas, and then supplies the signal components to the distributor 240.

The distributor 240 distributes the signal components to the transmission processors 220-1 to 220-K, respectively, the signal components obtained in the beamforming units 233 of the burst units 230-1 to 230-N and being to be transmitted to the antennas. In other words, the distributor 240 performs the mapping (logical→physical mapping) of weighted transmission signals of the respective bursts to predetermined frequency domains (symbols).

The transmission processors 220-1 to 220-K each include: a serial/parallel converter (S/P) 221 converting the transmission signal distributed by the distributor 240, from a serial signal to a parallel signal; a channel response value calculator 222 calculating channel response values $C^m$ of sub-channels in the corresponding antenna; a channel equalization unit 223 performing channel equalization by use of a factor obtained by multiplying a calibration vector by each of the channel response values, the calibration vector compensating a path difference, obtained in advance in a certain frequency band with an opposing device, that is, a path difference between the transmitting side and the receiving side; an inverse Fourier transform (IFFT) unit 224 performing inverse Fourier transform on the signal resulting from the channel equalization processing by the channel equalization unit 223, and then converting a transmission signal from a frequency domain to a time domain; a parallel/serial converter (P/S) 225 converting a parallel signal resulting from the inverse Fourier transform, to a serial signal; and a guard interval adder 226 adding a guard interval CP to the transmission signal converted to a serial signal.

Each of the transmission processors 220-1 to 220-K adds a guard interval CP to a transmission signal, and then transmits the transmission signal weighted by the AAS processing from the corresponding one of antennas 210-1 to 210-K.

Here, the antennas 110-1 to 110-K of the OFDM radio reception device 100 shown in FIG. 1 can be implemented as the same antennas as the antennas 210-1 to 210-K, respectively, of the OFDM radio transmission device 200 shown in FIG. 2 by use of antenna switchers (duplexers).

Alternatively, it is also possible to configure a radio base station including the OFDM radio reception device 100 and the OFDM radio transmission device 200.

Figure 3:
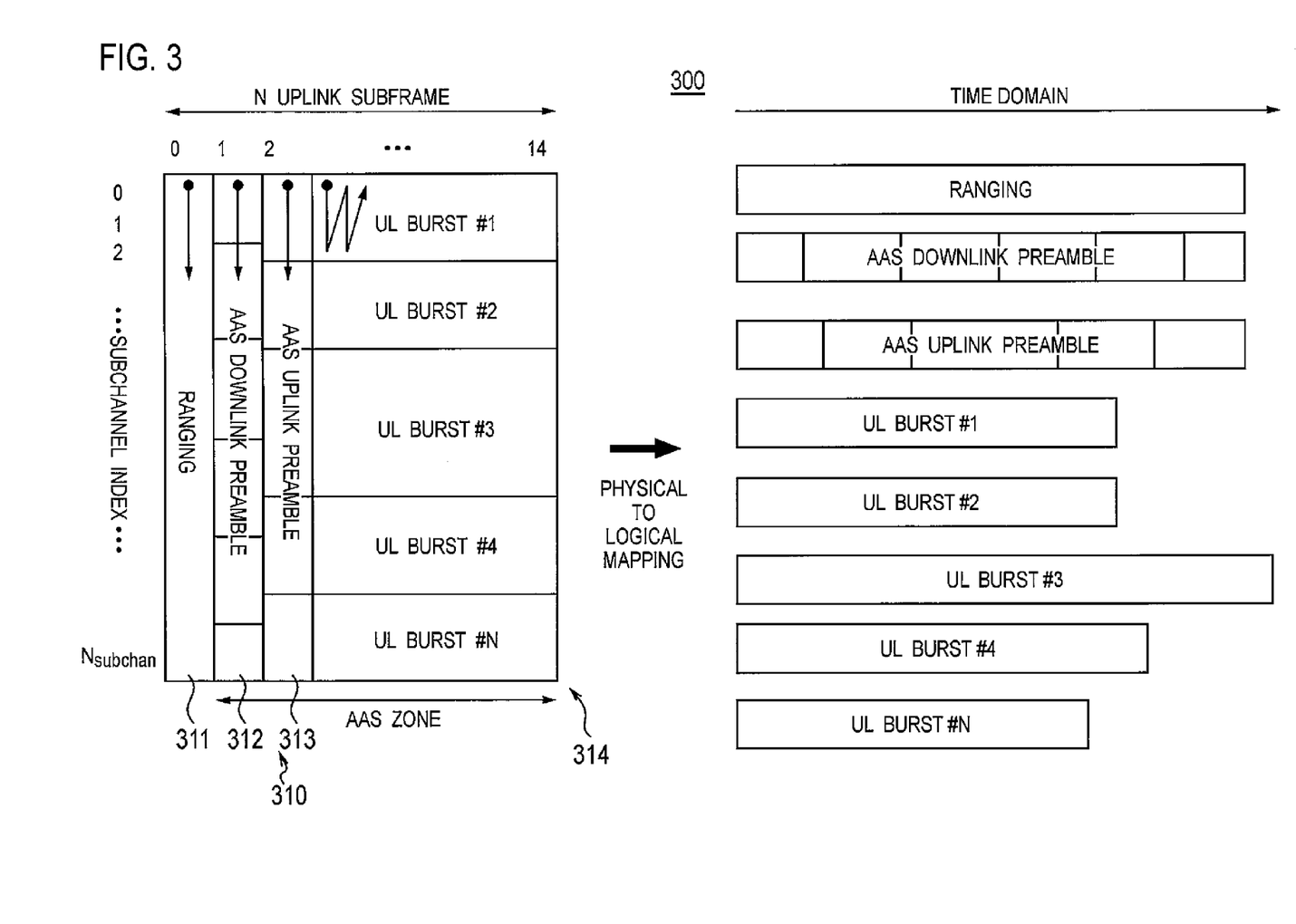
FIG. 3 is a diagram showing a downlink and uplink OFDM mapping frame configuration example in the embodiment of the present invention.

FIG. 3 is a diagram showing a configuration example of a downlink and uplink OFDM mapping frame according to this embodiment.

As shown in FIG. 3, an OFDM mapping frame 300 includes uplink subframes 310. In each of the uplink subframes 310, a ranging 311, AAS downlink preambles 312, AAS uplink preambles 313, and uplink data bursts 314 are included.

FIG. 3 shows the N-th uplink subframe 310 to illustrate an example of performing physical to logical mapping, by the distributor 140 of the OFDM radio reception device 100, on an uplink subframe extracted by the reception processor 120-N.

A downlink (not shown) includes a preamble, a FCH/MA, and downlink data bursts for the entire band.

The AAS downlink preambles 312 correspond to the frequencies of the downlink data bursts, respectively, and the AAS uplink preambles 313 correspond to the frequencies of the uplink data bursts 314.

Here, the uplink ranging 311 may be omitted. In this case, channel estimation can be performed by use of pilot sub-carriers contained in the uplink data bursts 314. Alternatively, channel estimation may be omitted.

For the ranging, preambles, AAS downlink preambles, AAS uplink preambles, and pilot sub-carriers, known signals which can be generated in the OFDM radio reception device 100 and which have sequences with low correlation are used.

Next, channel estimation, channel equalization, and AAS processing in the OFDM radio reception device 100 according to this embodiment will be described.

In channel estimation, a channel response value $h_k^m$ is obtained. Specifically, a ratio of a received signal to a desired signal is obtained for each sub-channel in a certain frequency band, as shown in Expression (1).

[Expression 1]

$$h_k^m = E\left[\dfrac{d^m(t)}{v_k^m(t)}\right] \quad (1)$$

Here, $d^m(t)$ and $v_k^m(t)$ indicate a reference signal in the corresponding sub-channel at time T and a received signal received in the sub-channel through the antenna 110-K at time t, respectively.

To perform channel estimation, a section in which a known reference signal can be generated in the OFDM radio reception device 100 is required. In this embodiment, the generation can be performed in the ranging, preambles, pilot sub-carriers, and the like.

In Expression (1), $E[\ ]$ indicates an ensemble average, and is for obtaining an average in the range of the sample number $N_{samp}$. A channel response $h_k^m$ is to be used at the time of transmission, and is accordingly stored in an unillustrated memory.

In channel equalization, Expression (2) is calculated for each of sub-channels of received signals.

[Expression 2]

$$x_k^m(t) = (h_k^m)^* v_k^m(t) \quad (2)$$

Here, $x_k^m(t)$ indicates an output signal resulting from channel equalization. In addition, * indicates a complex conjugate.

An AAS weighting factor is obtained by Expression (3).

[Expression 3]

$$W_n = R_{xx,n}^{-1} r_{xr,n} \quad (3)$$

Here, $^{-1}$ indicates inverse matrix. In addition, $R_{xx,n}$ is the covariance matrix of a received signal in the burst unit 130-n, and is obtained by Expression (4).

[Expression 4]

$$R_{xx,n} = E[X_n(t)X_n^H(t)]$$

$$= \begin{bmatrix} E[x_{1,n}(t)x_{1,n}^*(t)] & E[x_{1,n}(t)x_{2,n}^*(t)] & \cdots & E[x_{1,n}(t)x_{K,n}^*(t)] \\ E[x_{2,n}(t)x_{1,n}^*(t)] & E[x_{2,n}(t)x_{2,n}^*(t)] & \cdots & E[x_{2,n}(t)x_{K,n}^*(t)] \\ \vdots & \vdots & \ddots & \vdots \\ E[x_{K,n}(t)x_{1,n}^*(t)] & E[x_{K,n}(t)x_{2,n}^*(t)] & \cdots & E[x_{K,n}(t)x_{K,n}^*(t)] \end{bmatrix} \quad (4)$$

Here, $^H$ indicates complex conjugate transpose. In addition, $x_{k,n}(t)$ is a sample signal which is obtained at time t by: performing parallel/serial (P/S) conversion on the signal $x_k^m(t)$ from the antenna 110-K resulting from channel equalization; and then extracting a burst-n component from the resultant signal. Here, in terms of the sample number $N_{AAS}$, since the frequency widths of the bursts are not equal to each other, the symbol numbers in the frequency domains in the AAS downlink preamble and AAS uplink preamble are not equal.

Nevertheless, to be able to perform AAS processing uniformly in each condition, the number of samples to be used for weight estimation is fixed. The sub-channels are sequentially selected as signals to be sampled, in ascending order of the sub-channel numbers, in FIG. 3. However, a method of selecting signals to be sampled may be different from this as long as performed within the preambles.

In Expression (3), $r_{xr,n}$ is a cross-correlation vector of the received signal and the reference signal, and can be obtained by Expression (5).

[Expression 5]

$$r_{xr,n} = E[X_n(t)r_n^*(t)]$$
$$= [E[x_{1,n}(t)r_n^*(t)], E[x_{2,n}(t)r_n^*(t)], \ldots E[x_{K,n}(t)r_n^*(t)]]^T \quad (5)$$

Here, $^T$ indicates transpose. In addition, $r_n(t)$ is a reference signal of burst n at time t. The AAS downlink preambles and the AAS uplink preambles correspond to reference signals.

In obtaining an inverse matrix of the covariance matrix $R_{xx,n}$, error in calculation accuracy is likely to occur when an inverse matrix is simply calculated. Moreover, the number of calculations is extremely large. For these reasons, a solution with a simultaneous linear equation also using Cholesky decomposition is used.

Cholesky decomposition is performed on the covariance matrix $R_{xx,n}$ as shown in Expression (6).

[Expression 6]

$$R_{xx,n} = L_n L_n^H \quad (6)$$

Here, $L_n$ indicates lower triangular matrix.

In weighting factor estimation, Expression (3) is modified as follows.

[Expression 7]

$$R_{xx} W = r_{xr} \quad (7)$$

By substituting Expression (6) into Expression (7), Expression (8) is obtained.

[Expression 8]

$$LL^H W = r_{xr} \quad (8)$$

Next, a substitution matrix X is assumed as Expression (9).

[Expression 9]

$$L^H W = X \quad (9)$$

By substituting Expression (9) into Expression (8), Expression (10) is obtained.

[Expression 10]

$$LX = r_{xr} \quad (10)$$

By Expression (10), X is obtained. In addition, by substituting X into Expression (9), the weighting factor W is obtained.

Since $L_n$ is lower triangular matrix, the number of calculations can be decreased by half as compared to the case of obtaining inverse matrix.

Expression (3) to Expression (10) are used similarly in estimations of reception weighting factor and transmission weighting factor.

As shown in FIG. 3, transmission weighting factor is calculated in the AAS downlink preamble sections contained in the uplink. The obtained transmission weighting factor is held in an unillustrated memory until the time of transmission.

An unillustrated weighting factor combining circuit performs calculation using Expression (11).

[Expression 11]

$$y_n(t) = W_n^H X_n(t) \quad (11)$$

Demodulation processing and decoding processing are performed on an output signal $y_n(t)$ of the weighting factor combining circuit. The decoded output signal is transmitted to higher-level processing.

Next, transmission processing in the OFDM radio transmission device 200 will be described.

In the transmission processing, encoding processing and modulation processing are performed on data to be transmitted, for each burst. Thereby, weighting is performed on components of each antenna, as shown in Expression (12).

[Expression 12]

$$Y_n(t) = (W_n^{DL})^H x_n(t) \quad (12)$$

Weighted signals are each mapped to a certain frequency band as an OFDM signal, and serial/parallel (S/P) conversion is performed on each of the signals. The signals resulting from the S/P conversion each are divided in accordance with a different frequency component. Accordingly, the signals are each multiplied by a channel response vector for each sub-channel as in Expression (13).

[Expression 13]

$$z_k^m(t) = (c_k^m)^* y_k^m(t) \quad (13)$$

In Expression (13), $c_k^m$ indicates the channel response value of a sub-channel in an antenna. The channel response value is obtained by Expression (14).

[Expression 14]

$$C_k^m = (V_{CAL})^m H^m \quad (14)$$

Here, $H^m$ is a vector putting channel responses together as components of the corresponding antenna, the channel responses obtained by channel estimation. $H^m$ can be expressed as Expression (15).

[Expression 15]

$$H^m = [h_1^m, h_2^m, \ldots, h_K^m]^T \quad (15)$$

In addition, $(V_{CAL})^m$ indicates a calibration vector, and can be expressed as Expression (16).

[Expression 16]

$$(V_{CAL})^m = [(v_{CAL})_1^m, (v_{CAL})_2^m, \ldots, (v_{CAL})_K^m]^T \quad (16)$$

The calibration vector $(V_{CAL})^m$ is a hardware path difference between a transmitting side and a receiving side in the corresponding sub-channel. When processing in which neither channel estimation nor channel equalization is performed is employed, Expression (17) is used instead of Expression (14) because Expression (14) is a vector for which only calibration vector is significant.

[Expression 17]

$$C_k^m = (V_{CAL})^m \quad (17)$$

Next, outlines of the reception processing of the OFDM radio reception device 100 and the transmission processing of the OFDM radio transmission device 200 according to this embodiment described above will be described.

Figure 4:
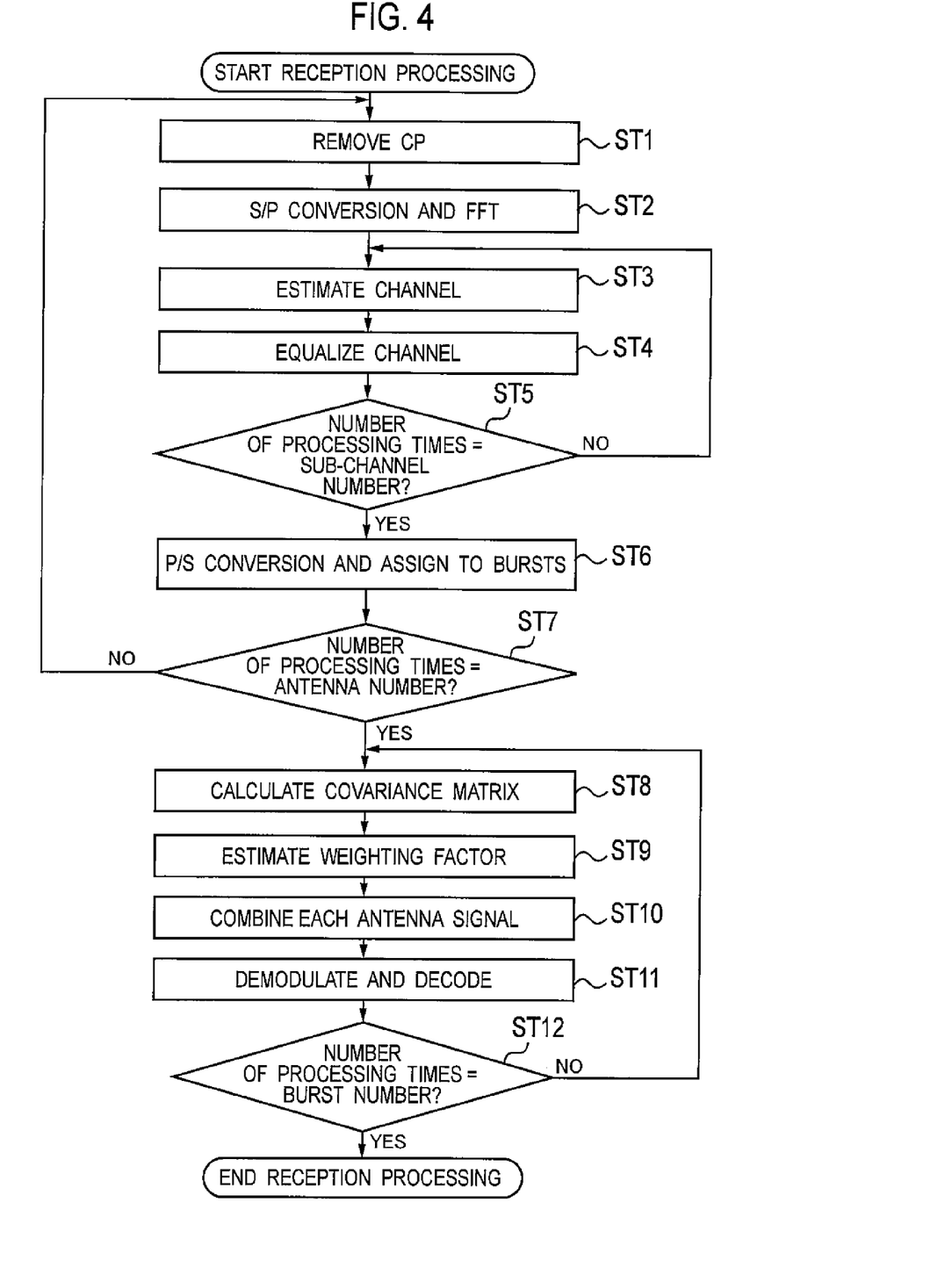
FIG. 4 shows a flow of reception processing in which channel estimation in frequency domain, channel equalization, and AAS processing are performed.

FIG. 4 shows a flow of the reception processing including frequency domain channel estimation, channel equalization and AAS processing.

As shown in FIG. 4, in Step ST1, the OFDM radio reception device 100 (guard interval remover 121) including the AAS (adaptive antenna system) removes a guard interval CP from each digitalized antenna-received signal.

In Step ST2, the OFDM radio reception device 100 performs serial/parallel (S/P) conversion and then fast Fourier transform.

In Step ST3, the OFDM radio reception device 100 (channel estimation unit 124) performs channel estimation.

In Step ST4, the OFDM radio reception device 100 (channel equalization unit 125) multiplies a signal resulting from the fast Fourier transform by the corresponding channel response value obtained in the channel estimation, to perform channel equalization.

After performing processing of Steps ST3 and ST4 in accordance with the number of sub-channels (YES in Step ST5), the OFDM radio reception device 100 converts each of the parallel signals resulting from the channel equalization to a serial signal at the corresponding parallel/serial converter 126 in Step ST6. Moreover, the OFDM radio reception device 100 maps the serial signals to the burst units 130-1 to 130-N.

After repeating the processing of Step ST1 to ST6 for the number K of the antennas (YES in Step ST7), the OFDM radio reception device 100 (calculator 131) obtains a covariance matrix in Step ST8.

In Step ST9, the OFDM radio reception device 100 (multiplier 132) calculates a reception weighting factor on the basis of the corresponding covariance matrix, so as to estimate a weighting factor. In Step ST10, the OFDM radio reception device 100 multiplies each of the signals mapped to the bursts by the corresponding estimated reception weighting factor to combine (synthesize) antenna signals. In Step ST11, the OFDM radio reception device 100 (decoder 133) demodulates and decodes each of the combined signals.

Here, a common covariance matrix for SDMA users can be alternatively obtained in ST8, and reception weighting factor can be alternatively calculated for each of the SDMA users in ST9. In addition, desired signals combined for each of the SDMA users can be demodulated and decoded in ST11, instead.

The OFDM radio reception device 100 performs processing of Steps ST8 to ST11 for the number of bursts.

Figure 5:
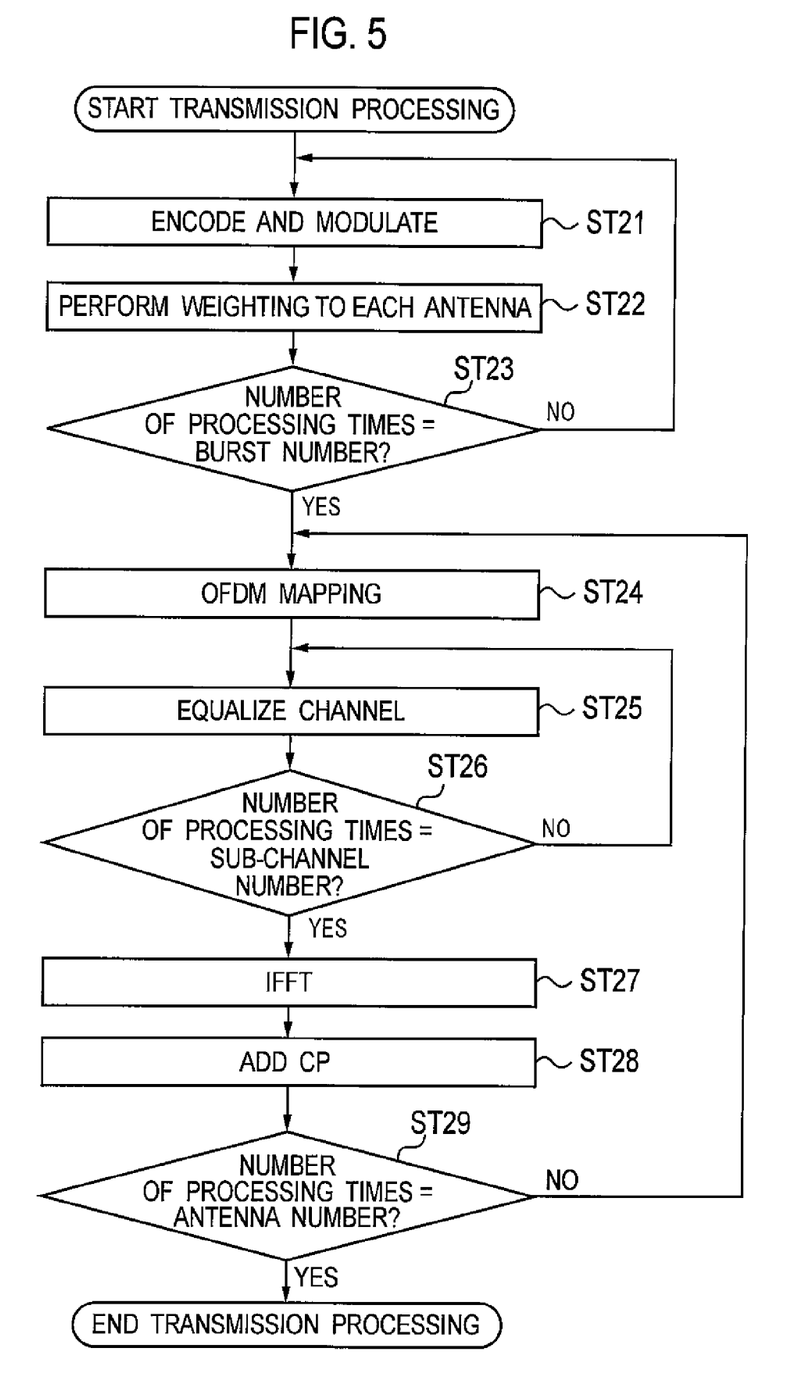
FIG. 5 shows a flow of transmission processing in which channel estimation in frequency domain, channel equalization, and AAS processing are performed.

FIG. 5 shows a flow of transmission processing including frequency domain channel estimation, channel equalization and AAS processing.

As described above, in the reception processing, a transmission weighting factor is calculated on the basis of the covariance matrix of each burst, and the obtained transmission weighting factor of each burst is stored. In transmission processing, the stored transmission weighting factors are used.

Here, it is also possible to obtain a common covariance matrix for SDMA users of each burst, and to thereby calculate a transmission weighting factor for each SDMA user, instead.

As shown in FIG. 5, in Step ST21, the OFDM radio transmission device 200 (encoder 231) performs encoding processing and modulation processing on data to be transmitted at transmission timings of signals for each burst.

In Step ST22, the OFDM radio transmission device 200 multiplies a transmission signal of each burst by the transmission weighting factor obtained in advance for the burst. Here, in Step ST22, the beamforming unit 233 can alternatively multiply a signal $X_n$ obtained by the corresponding encoder 231 by the transmission weighting factor $W_n^{DL}$ obtained by the corresponding weight multiplier 232 and then add a signal of each SDMA user to the resultant value for each antenna.

After performing the processing of Steps ST 21 and ST22 in accordance with the number of bursts (YES in Step ST23), the OFDM radio transmission device 200 distributes signal components to be transmitted to the antennas, to the corresponding transmission processors 220-1 to 220-K in Step ST24, in other words, performs mapping (OFDM mapping) of the signal components to the entire frequency domains for the bursts in the antennas.

In Step ST25, the OFDM radio transmission device 200 performs channel equalization. Specifically, the serial/parallel converter 221 converts a distributed signal from a serial signal to a parallel signal. Moreover, the channel equalization unit 223 multiplies each signal resulting from the S/P conversion by a calibration vector and a factor multiplied by a corresponding channel response value so as to perform channel equalization. The calibration vector compensates the path difference between the OFDM radio transmission device 200 and the OFDM radio reception device 100 obtained in a certain frequency band in advance.

After performing processing of Step ST25 in accordance with the number of sub-channels (YES in Step ST26), the OFDM radio transmission device 200 (IFFT unit 224) performs inverse Fourier transform of each signal resulting from channel equalization processing, in Step ST27.

In Step ST28, the OFDM radio transmission device 200 converts each signal resulting from inverse Fourier transform into a serial signal, and then adds a guard interval CP to each converted signal.

The OFDM radio transmission device 200 performs the processing of Steps ST24 to ST28 for the number K of antennas.

Transmission signals each weighted by AAS processing and having a guard interval CP added thereto are transmitted from the corresponding antennas 210-1 to 210-K.

As described above, according to this embodiment, the OFDM radio reception device 100 with the multiple antennas 110-1 to 110-K includes the AAS (adaptive antenna system), and removes a guard interval CP from each received signal. Moreover, the OFDM radio reception device 100 performs S/P conversion, FFT, and channel estimation on each received signal. Furthermore, the OFDM radio reception device 100 performs channel equalization by multiplying each signal resulting from FFT by a corresponding channel response value obtained by channel estimation.

Then, the OFDM radio reception device 100 performs P/S conversion on each of the received signals, performs mapping of the resultant signals to the bursts, and thereafter obtains a covariance matrix for each of the busts. Moreover, the OFDM radio reception device 100 calculates a reception weighting factor on the basis of each covariance matrix, multiplies each signal mapped to the corresponding burst by the corresponding reception weighting factor, and then combines the received signals. The OFDM radio reception device 100 performs demodulation and decoding of the combined received signals.

Here, alternatively, after performing mapping of signals to the bursts, the OFDM radio reception device 100 may obtain a common covariance matrix of SDMA users and calculate reception weighting factor for each SDMA user on the basis of the covariance matrix. Moreover, the OFDM radio reception device 100 may multiply each of the signals mapped to the bursts by the corresponding reception weighting factor, and then combine received signals. Furthermore, the OFDM radio reception device 100 may extract a desired signal for each SDMA signal, and then perform demodulation and decoding on each extracted desired signal.

In OFDM signal processing, the OFDM radio reception device 100 receives, through each antenna, a signal containing a preamble signal in a corresponding frequency domain which can be generated on the receiving side. The OFDM radio reception device 100 performs FFT on each received signal, and then estimates a channel response value. Moreover, the OFDM radio reception device 100 performs channel equalization.

In each outputted signal after channel equalization, an AAS preamble is also included. The OFDM radio reception device 100 performs AAS reception processing for estimating a reception weighting factor through matrix manipulation using Cholesky decomposition.

Here, alternatively, in OFDM signal processing, the OFDM radio reception device 100 may include a multiplexed SDMA preamble. Moreover, the OFDM radio reception device 100 may generate a known signal for a SDMA user desired by the receiving side, and estimate a reception weighting factor through matrix manipulation using Cholesky decomposition. Furthermore, the OFDM radio reception device 100 may estimate optimal reception weighting factor for each SDMA user, and separate user information from a spatial-multiplexed signal by use of AAS reception processing.

The OFDM radio transmission device 200 with the multiple antennas 210-1 to 210-K includes the AAS, stores transmission weighting factors of the bursts, and multiplies a transmission signal of each burst on which encoding processing and modulation processing are performed, by the corresponding transmission weighting factor, at a timing of signal transmission.

Moreover, the OFDM radio transmission device 200 performs OFDM mapping of transmission signals to be distributed to the antennas. The OFDM radio transmission device 200 performs S/P conversion on each of the transmission signals, and multiplies each of the resultant signals by the calibration vector and the corresponding channel response value for each channel. Moreover, the OFDM radio transmission device 200 performs IFFT and P/S conversion on each of the transmission signal, and adds a CP to each resultant signal. The OFDM radio transmission device 200 transmits each transmission signal with a CP added thereto, through the corresponding antenna.

Furthermore, in OFDM signal processing, the OFDM radio transmission device 200 multiplies each transmission signal by a corresponding transmission weighting factor, and distributes the transmission signals to the antennas so as to transmit the signals.

Here, alternatively, in OFDM signal processing, the OFDM radio transmission device 200 may include a multiplexed SDMA preamble. Moreover, the OFDM radio transmission device 200 may generate a known signal for a SDMA user desired by the receiving side, and estimate a transmission weighting factor through matrix manipulation using Cholesky decomposition. Furthermore, the OFDM radio transmission device 200 may estimate an optimal transmission weighting factor for each SDMA user, multiply a transmission signal by the corresponding transmission weighting factor and then add signals for each SDMA users at the time of transmission, and distribute multiplexed transmission signals to the antennas.

With the OFDM radio reception device 100 and the OFDM radio transmission device 200 having the above-described configurations, the following effects can be obtained.

According to this embodiment, channel estimation is performed in a frequency domain, a preamble can be used on the frequency axis in AAS processing. Accordingly, multiple preambles are not required on the time axis, and the number of transmittable data symbols can thus be increased. Consequently, data throughput can be improved.

Even in a multipath propagation environment occurring in communications in an urban area or the like, in reception processing using SDMA, information only on a desired terminal can be efficiently separated. In addition, in transmission processing, it is possible to form beam to a desired terminal, and form a null point to each of terminals other than the desired terminal.

Moreover, in this embodiment, Cholesky decomposition requiring a small calculation amount and providing high accuracy in estimation is used for preambles provided on the frequency axis. In other words, since a weighting factor is estimated by use of solution of simultaneous linear equation, excellent AAS characteristics and reduction in cost of an arithmetic processor can be achieved.

Also in channel estimation, since processing is performed in a frequency domain after FFT, a calculation amount can be small. Accordingly, cost in development and manufacture of devices can be reduced by reducing the number of processors, for example.

In sum, according to this embodiment, excellent AAS characteristics can be achieved in an OFDM radio transmitting/receiving device, and interference to other terminals can thus be suppressed, in a multipath propagation environment occurring in communications in an urban area, or communications between moving terminals. In addition, directivity to a desired terminal can be provided. Consequently, effects of the use of frequency can be improved. Moreover, with a simplified AAS processing, a calculation amount in AAS processing is reduced. Accordingly, cost in development and manufacture of devices can be reduced.

Second Embodiment

Next, a second embodiment of the present invention will be described. In this embodiment, the present invention solves the following problems in prior techniques. Here, a configuration example of an OFDM radio reception device, a configuration example of an OFDM radio transmission device, and OFDM signal receiving processing by the OFDM radio reception device according to this embodiment are the same as those of the above described first embodiment.

(1) Background Techniques

By using radio base station device with multiple antennas in SDMA, the number of terminals the base station can simultaneously manage can be increased, and effects of the use of frequency can be improved. In SDMA, multiple user signals are multiplexed at the same time in the same frequency. Accordingly, directivity needs to be provided in relation to a desired user terminal, while a null point needs to be formed to each of user terminals other than the desired one.

SDMA is generally performed by use of adaptive antenna system (AAS). In addition, MMSE is often used as an algorithm for AAS. In MMSE, a known signal is uniquely added to a transmission signal to be transmitted to each user terminal, for each terminal. The radio base station determines a weighting factor such that the difference between a known signal transmitted from a desired terminal and a replica of the known signal can be the smallest.

For example, in the method described in Japanese Patent Application Publication No. 2003-152676, measures against deterioration in AAS performance without maintaining the orthogonality between sub-carriers due to the delay wave or the like, that is, deterioration in SDMA processing capability, are provided. Specifically, as a known signal, a particular frequency is assigned to each terminal in advance. Then, channel estimation is performed for each sub-carrier, and a weighting factor is obtained for each terminal.

In addition, in the above-described patent document, estimation of a weighting factor by use of a matrix of sub-channel components and antenna components is described.

(2) Problems to be Solved by the Invention

However, in the method described in the above-described patent document, data signals are space-multiplexed, while known signals are assigned to independent frequency bands, respectively. For this reason, even when beam is formed for a desired terminal, it may be difficult to suppress interference with other signals, and to obtain sufficient capability to form a null point to each of terminals other than the desired terminal. The present invention has an object of providing a radio reception device, a radio transmission device, a radio base station, a reception method, and a transmission method which are capable of suppressing interference with other signals and of obtaining sufficient capability to form a null point to other terminals.

(3) Means for Solving the Problems

To achieve the above-described object, a radio reception device according to a first aspect of the present invention comprises: a plurality of antennas; a channel estimation unit configured to perform channel estimation for received signals of each of the antennas; a channel equalization unit configured to perform channel equalization on channel response values estimated by the channel estimation unit; and a burst distributor configured to distribute the received signals to a plurality of bursts. Here, the burst distributor includes: a calculator configured to calculate reception weighting factors of the respective antennas for each user; a multiplier configured to multiply each of the received signals by the corresponding reception weighting factor; and a combiner configured to combine the received signals each multiplied by the corresponding reception weighting factor by the multiplier.

A radio transmission device according to a second aspect of the present invention comprises: a plurality of antennas; a weighting unit configured to perform a predetermined weighting to a transmission signal component of each of the antennas for each user; a distributor configured to distribute the weighted transmission signals for the respective users, to the respective antennas; a channel equalization unit configured to perform channel equalization on at least channel response values of channels by use of the distributed weighted transmission signals as frequency components; and a transmitter configured to perform time-domain conversion on the transmission signals on which channel equalization has been performed, and to then transmit the resultant signals in a predetermined format from the antennas.

A radio base station according to a third aspect of the present invention comprises: a plurality of antennas; a radio reception device configured to receive a radio signal; and a radio transmission device configured to transmit a radio signal in a predetermined format through each antenna. Here, the radio reception device includes: a channel estimation unit configured to perform channel estimation for received signals of each of the antennas; a channel equalization unit configured to perform channel equalization on channel response values estimated by the channel estimation unit; and a burst distributor configured to distribute the received signals to a plurality of bursts. The burst distributor includes: a calculator configured to calculate reception weighting factors of the respective antennas for each user; a multiplier configured to multiply each of the received signals by the corresponding reception weighting factor; and a combiner configured to combine the received signals each multiplied by the corresponding reception weighting factor by the multiplier. The radio transmission device includes: a weighting unit configured to perform a predetermined weighting to a transmission signal component of each of the antennas for each user; a distributor configured to distribute the weighted transmission signals to the respective antennas; a channel equalization unit configured to perform channel equalization on at least channel response values of channels by use of the distributed weighted transmission signals as frequency components; and a transmitter configured to perform time-domain conversion on the transmission signals on which channel equalization has been performed, and to then transmit the resultant signals in a predetermined format from the antennas.

Preferably, the burst distributor: distributes the received signals to the bursts, and thereafter obtains a common covariance matrix of the users; and calculates a transmission weighting factor for each user on the basis the covariance matrix, and then stores the transmission weighting factor of each of the bursts. Moreover, preferably, the weighting unit of the radio transmission device performs weighting on the basis of the stored transmission weighting factors.

Preferably, the channel estimation unit of the radio reception device obtains a ratio of each of the received signal to a desired signal determined for each sub-channel of a certain frequency band, as a channel response value, and the channel equalization unit performs channel equalization for each sub-channel.

Preferably, the channel estimation unit performs frequency-domain conversion on each of the received signals and thereafter estimates the channel response values.

Preferably, an output signal of the channel equalization unit contains a predetermined preamble signal, and the multiplier estimates a reception weighting factor through matrix manipulation using Cholesky decomposition.

Preferably, an output signal of the channel equalization unit of the radio reception device contains a predetermined preamble signal, and the weighting unit of the radio reception device estimates a transmission weighting factor through matrix manipulation using Cholesky decomposition.

Preferably, the channel equalization unit of the radio transmission device multiplies the channel response value of each of the channels by a calibration vector for compensating a path difference between a transmitting side and a receiving side so as to obtain factors, and then multiplies each of signals obtained by dividing the distributed weighted transmission signals in accordance with frequency components, by the corresponding factor, thereby performing channel equalization.

A fourth aspect of the present invention provides a reception method employing an orthogonal frequency division multiplex scheme using multiple sub-channels. The reception method comprises: a first step of performing a channel estimation for each of received signals of a plurality of antennas; a second step of performing channel equalization on channel response values estimated in the first step; and a third step of distributing the received signals to a plurality of bursts on the basis of relationships between the sub-channels and the plurality of bursts. Here, the third step includes: a fourth step of obtaining a common covariance matrix of users, and calculating reception weighting factors of the respective users on the basis of the covariance matrix; a fifth step of multiplying each of the received signals by the corresponding reception weighting factor; and a sixth step of combining the received signals each multiplied by the corresponding reception weighting factor.

A fifth aspect of the present invention provides a transmission method employing an orthogonal frequency division multiplex scheme using multiple sub-channels. Here, the transmission method comprises: a first step of performing a predetermined weighting to a transmission signal component of each of the antennas for each user; a second step of distributing the weighted transmission signals to the respective antennas; a third step of setting the distributed weighted transmission signals as frequency components; a fourth step of multiplying the channel response value of each of the channels by a calibration vector of a sub-carrier for compensating a path difference between a transmitting side and a receiving side so as to obtain factors, and then multiplying each of signals obtained by dividing the distributed weighted transmission signals in accordance with frequency components, by the corresponding factor, thereby performing channel equalization; and a fifth step of performing time-domain conversion on the transmission signals on which channel equalization has been performed, and then transmitting the resultant signals in a predetermined format from the antennas.

According to these aspects of the present invention, advantages of being able to improve capability of the base station to simultaneously manage terminals and the total effect of the use of frequency are provided.

(Others)

It should be noted that the entire contents of Japanese Patent Application Publication No. 2006-092429 (filed on Mar. 29, 2006) and Japanese Patent Application Publication No. 2006-092430 (filed on Mar. 29, 2006) are incorporated herein by reference.

INDUSTRIAL APPLICABILITY

As described above, a radio reception device, a radio transmission device, a radio base station, a reception method, and a transmission method according to the present invention can provide highly accurate AAS processing and also reduce processing load. Moreover, a radio reception device, a radio transmission device, a radio base station, a reception method, and a transmission method according to the present invention can improve capability of a base station to simultaneously manage terminals, and can improve the effects of the use of frequency. Hence, the present invention is useful for radio communications such as mobile communications.

The invention claimed is:
1. A radio reception device comprising:
a plurality of antennas;
a channel estimation unit configured to perform channel estimation for received signals of each of the antennas;
a channel equalization unit configured to perform channel equalization on channel response values estimated by the channel estimation unit; and
a burst distributor configured to distribute the received signals to a plurality of bursts,
wherein the burst distributor includes:
a calculator configured to calculate reception weighting factors of the respective antennas;
a multiplier configured to multiply each of the received signals by the corresponding reception weighting factor; and
a combiner configured to combine the received signals each multiplied by the corresponding reception weighting factor by the multiplier.

2. The radio reception device according to claim 1, wherein
the channel estimation unit obtains a ratio of each of the received signals to a desired signal for each sub-channel of a certain frequency band, as a channel response value, and
the channel equalization unit performs channel equalization for each sub-channel.

3. The radio reception device according to claim 1, wherein the channel estimation unit estimates the channel response value after performing frequency domain conversion on the corresponding received signal.

4. The radio reception device according to any one of claims 1 to 3, wherein
an output signal of the channel equalization unit contains a predetermined preamble signal, and
the multiplier estimates a reception weighting factor through matrix manipulation using Cholesky decomposition.

5. A radio transmission device comprising:
a plurality of antennas;
a weighting unit configured to perform a predetermined weighting to a transmission signal component of each of the antennas;
a distributor configured to distribute the weighted transmission signals to the respective antennas;
a channel equalization unit configured to perform channel equalization on at least channel response values of channels by use of the distributed weighted transmission signals as frequency components; and
a transmitter configured to perform time-domain conversion on the transmission signals on which channel equalization has been performed, and to then transmit the resultant signals in a predetermined format from the antennas,
wherein the channel equalization unit multiplies the channel response value of each of the channels by a calibration vector for compensating a path difference between a transmitting side and a receiving side so as to obtain factors, and then multiplies each of signals obtained by dividing the distributed weighted transmission signals in accordance with frequency components, by the corresponding factor, thereby performing channel equalization.

6. A radio base station comprising:
a plurality of antennas;
a radio reception device configured to receive a radio signal; and
a radio transmission device configured to transmit a radio signal in a predetermined format through each antenna, wherein
the radio reception device includes:
a channel estimation unit configured to perform channel estimation for received signals of each of the antennas;
a channel equalization unit configured to perform channel equalization on channel response values estimated by the channel estimation unit; and
a burst distributor configured to distribute the received signals to a plurality of bursts, the burst distributor including:
a calculator configured to calculate reception weighting factors of the respective antennas;
a multiplier configured to multiply each of the received signals by the corresponding reception weighting factor; and
a combiner configured to combine the received signals each multiplied by the corresponding reception weighting factor by the multiplier, and the radio transmission device includes:
a weighting unit configured to perform a predetermined weighting to a transmission signal component of each of the antennas;
a distributor configured to distribute the weighted transmission signals to the respective antennas;
a channel equalization unit configured to perform channel equalization on at least channel response values of channels by use of the distributed weighted transmission signals as frequency components; and
a transmitter configured to perform time-domain conversion on the transmission signals on which channel equalization has been performed, and to then transmit the resultant signals in a predetermined format from the antennas.

7. The radio base station according to claim 6, wherein the burst distributor
distributes the received signals to the bursts, and thereafter obtains covariance matrices of the respective bursts, and
calculates a transmission weighting factor on the basis of each of the covariance matrices, and then stores the transmission weighting factor of each of the bursts, and
the weighting unit of the radio transmission device performs weighting on the basis of the stored transmission weighting factors.

8. The radio base station according to claim 6, wherein
the channel estimation unit of the radio reception device obtains a ratio of each of the received signal to a desired signal for each sub-channel of a certain frequency band, as a channel response value, and
the channel equalization unit performs channel equalization for each sub-channel.

9. The radio base station according to claim 6, wherein the channel estimation unit performs frequency domain conversion on each of the received signals and thereafter estimates the channel response values.

10. The radio base station according to claim 6, wherein an output signal of the channel equalization unit contains a predetermined preamble signal, and is the multiplier estimates a reception weighting factor through matrix manipulation using Cholesky decomposition.

11. The radio base station according to claim 6, wherein
an output signal of the channel equalization unit of the radio reception device contains a predetermined preamble signal, and
the weighting unit of the radio transmission device estimates a transmission weighting factor through matrix manipulation using Cholesky decomposition.

12. The radio base station according to any one of claims 6 to 11, wherein the channel equalization unit of the radio transmission device multiplies the channel response value of each of the channels by a calibration vector for compensating a path difference between a transmitting side and a receiving side so as to obtain factors, and then multiplies each of signals obtained by dividing the distributed weighted transmission signals in accordance with frequency components, by the corresponding factor, thereby performing channel equalization.

13. A reception method employing an orthogonal frequency division multiplex scheme using multiple sub-channels, the reception method comprising;
a first step of performing a channel estimation for each of received signals of a plurality of antennas;
a second step of performing channel equalization on channel response values estimated in the first step; and a third step of distributing the received signals to a plurality of bursts on the basis of associations between the sub-channels and the plurality of bursts, wherein the third step includes:

a fourth step of obtaining a covariance matrix, and calculating reception weighting factors of the respective antennas on the basis of the covariance matrix;

a fifth step of multiplying each of the received signals by the corresponding reception weighting factor; and a sixth step of combining the received signals each multiplied by the corresponding reception weighting factor.

14. A transmission method employing an orthogonal frequency division multiplex scheme including a plurality of antennas using a plurality of sub-channels, the transmission method comprising:

a first step of performing a predetermined weighting to a transmission signal component of each of the antennas;

a second step of distributing the weighted transmission signals to the respective antennas;

a third step of setting the distributed weighted transmission signals as frequency components;

a fourth step of multiplying the channel response value of each of the channels by a calibration vector of a sub-carrier for compensating a path difference between a transmitting side and a receiving side so as to obtain factors, and then multiplying each of signals obtained by dividing the distributed weighted transmission signals in accordance with frequency components, by the corresponding factor, thereby performing channel equalization; and a fifth step of performing time-domain conversion on the transmission signals on which channel equalization has been performed, and then transmitting the resultant signals in a predetermined format from the antennas.

15. A radio reception device comprising:

a plurality of antennas;

a channel estimation unit configured to perform channel estimation for received signals of each of the antennas;

a channel equalization unit configured to perform channel equalization on channel response values estimated by the channel estimation unit; and a burst distributor configured to distribute the received signals to a plurality of bursts, wherein the burst distributor includes:

a calculator configured to calculate reception weighting factors of the respective antennas for each user;

a multiplier configured to multiply each of the received signals by the corresponding reception weighting factor; and a combiner configured to combine the received signals each multiplied by the corresponding reception weighting factor by the multiplier.

16. The radio reception device according to claim 15 wherein the channel estimation unit obtains a ratio of each of the received signals to a desired signal for each sub-channel of a certain frequency band, as a channel response value, and the channel equalization unit performs channel equalization for each sub-channel.

17. The radio reception device according to claim 15, wherein the channel estimation unit estimates the channel response value after performing frequency domain conversion on the corresponding received signal.

18. The radio reception device according to any one of claims 15 to 17, wherein an output signal of the channel equalization unit contains a predetermined preamble signal, and the multiplier estimates a reception weighting factor through matrix manipulation using Cholesky decomposition.

19. A radio transmission device comprising:

a plurality of antennas;

a weighting unit configured to perform a predetermined weighting to a transmission signal component of each of the antennas for each user;

a distributor configured to distribute the weighted transmission signals for the respective users, to the respective antennas;

a channel equalization unit configured to perform channel equalization on at least channel response values of channels by use of the distributed weighted transmission signals as frequency components; and a transmitter configured to perform time-domain conversion on the transmission signals on which channel equalization has been performed, and to then transmit the resultant signals in a predetermined format from the antennas, wherein the channel equalization unit multiplies the channel response value of each of the channels by a calibration vector for compensating a path difference between a transmitting side and a receiving side so as to obtain factors, and then multiplies each of signals obtained by dividing the distributed weighted transmission signals in accordance with frequency components, by the corresponding factor, thereby performing channel equalization.

20. A radio base station comprising;

a plurality of antennas;

a radio reception device configured to receive a radio signal; and a radio transmission device configured to transmit a radio signal in a predetermined format through each antenna, wherein the radio reception device includes:

a channel estimation unit configured to perform channel estimation for received signals of each of the antennas;

a channel equalization unit configured to perform channel equalization on channel response values estimated by the channel estimation unit; and a burst distributor configured to distribute the received signals to a plurality of bursts, the burst distributor including:

a calculator configured to calculate reception weighting factors of the respective antennas for each user;

a multiplier configured to multiply each of the received signals by the corresponding reception weighting factor; and a combiner configured to combine the received signals each multiplied by the corresponding reception weighting factor by the multiplier, and the radio transmission device includes:

a weighting unit configured to perform a predetermined weighting to a transmission signal component of each of the antennas for each user;

a distributor configured to distribute the weighted transmission signals to the respective antennas;

a channel equalization unit configured to perform channel equalization on at least channel response values of channels by use of the distributed weighted transmission signals as frequency components; and a transmitter configured to perform time-domain conversion on the transmission signals on which channel equalization has been performed, and to then transmit the resultant signals in a predetermined format from the antennas.

21. The radio base station according to claim 20, wherein the burst distributor
distributes the received signals to the bursts, and thereafter obtains a common covariance matrix of the users, and
calculates a transmission weighting factor for each user on the basis the covariance matrix, and then stores the transmission weighting factor of each of the bursts, and
the weighting unit of the radio transmission device performs weighting on the basis of the stored transmission weighting factors.

22. The radio base station according to claim 20, wherein
the channel estimation unit of the radio reception device obtains a ratio of each of the received signal to a desired signal for each sub-channel of a certain frequency band, as a channel response value, and
the channel equalization unit performs channel equalization for each sub-channel.

23. The radio base station according to claim 20, wherein the channel estimation unit performs frequency-domain conversion on each of the received signals and thereafter estimates the channel response values.

24. The radio base station according to claim 20, wherein an output signal of the channel equalization unit contains a predetermined preamble signal, and
the multiplier estimates a reception weighting factor through matrix manipulation using Cholesky decomposition.

25. The radio base station according to claim 20, wherein an output signal of the channel equalization unit of the radio reception device contains a predetermined preamble signal, and
the weighting unit of the radio reception device estimates a transmission weighting factor through matrix manipulation using Cholesky decomposition.

26. The radio base station according to any one of claims 20 to 25, wherein the channel equalization unit of the radio transmission device multiplies the channel response value of each of the channels by a calibration vector for compensating a path difference between a transmitting side and a receiving side so as to obtain factors, and then multiplies each of signals obtained by dividing the distributed weighted transmission signals in accordance with frequency components, by the corresponding factor, thereby performing channel equalization.

27. A reception method employing an orthogonal frequency division multiplex scheme using multiple sub-channels, the reception method comprising;
a first step of performing a channel estimation for each of received signals of a plurality of antennas;
a second step of performing channel equalization on channel response values estimated in the first step; and
a third step of distributing the received signals to a plurality of bursts on the basis of associations between the sub-channels and the plurality of bursts,
wherein the third step includes:
a fourth step of obtaining a common covariance matrix of users, and calculating reception weighting factors of the respective users on the basis of the covariance matrix;
a fifth step of multiplying each of the received signals by the corresponding reception weighting factor; and
a sixth step of combining the received signals each multiplied by the corresponding reception weighting factor.

28. A transmission method employing an orthogonal frequency division multiplex scheme including multiple antennas using multiple sub-channels, the transmission method comprising:
a first step of performing a predetermined weighting to a transmission signal component of each of the antennas for each user;
a second step of distributing the weighted transmission signals to the respective antennas;
a third step of setting the distributed weighted transmission signals as frequency components;
a fourth step of multiplying the channel response value of each of the channels by a calibration vector of a sub-carrier for compensating a path difference between a transmitting side and a receiving side so as to obtain factors, and then multiplying each of signals obtained by dividing the distribute weighted transmission signals in accordance with frequency components, by the corresponding factor, thereby performing channel equalization; and
a fifth step of performing time-domain conversion on the transmission signals on which channel equalization has been performed, and then transmitting the resultant signals in a predetermined format from the antennas.

* * * * *